(12) United States Patent
Iwazaki

(10) Patent No.: US 6,907,333 B2
(45) Date of Patent: Jun. 14, 2005

(54) STEERING DEVICE

(75) Inventor: Katsuhiko Iwazaki, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/232,398

(22) Filed: Sep. 3, 2002

(65) Prior Publication Data

US 2003/0050748 A1 Mar. 13, 2003

(30) Foreign Application Priority Data

Sep. 10, 2001 (JP) .......................................... 2001-273978

(51) Int. Cl.[7] ................................................. B62F 6/00
(52) U.S. Cl. ......................................................... 701/41
(58) Field of Search ...................... 701/41–42; 180/409, 180/428, 443, 446, 6.2, 6.24, 6.44

(56) References Cited

U.S. PATENT DOCUMENTS 5,629,595 A * 5/1997 Salter et al. ................. 318/587
2001/0054519 A1 * 12/2001 Nishiwaki et al. ........... 180/167

FOREIGN PATENT DOCUMENTS

| JP | A 4-205505 | 7/1992 |
| JP | A 4-205506 | 7/1992 |
| JP | A 9-207800 | 8/1997 |
| JP | A 11-198839 | 7/1999 |
| JP | A 2001-39325 | 2/2001 |

* cited by examiner

*Primary Examiner*—Thu V. Nguyen
(74) *Attorney, Agent, or Firm*—Oliff & Berridge, PLC

(57) ABSTRACT

An automatic steering device applies a steering torque in an automatic steering mode to a steering shaft of a steering mechanism that turns a wheel of a vehicle in accordance with rotation of the steering shaft connected to a steering wheel. The automatic steering device includes a controller that calculates an automatic steering torque value and a target assist torque value, and an actuator that is controlled by the controller so as to apply torque corresponding to a sum of the automatic steering torque value and the target assist torque value to the steering shaft. The controller calculates the target assist torque value by multiplying an assist torque gain by a steering torque applied by an operator of the vehicle from the steering wheel to the steering shaft, and sets the assist torque gain in the automatic steering mode so as to be smaller than an assist torque gain in a non-automatic steering mode.

7 Claims, 4 Drawing Sheets

STEERING ANGLE (θ)

STEERING TORQUE DETECTION VALUE

STEERING DEVICE

INCORPORATION BY REFERENCE

The disclosure of Japanese Patent Application No. 2001-273978 filed on Sep. 10, 2001, including the specification, drawings and abstract is incorporated herein by reference in its entirety.

BACKGROUND OF THE INVENTION

1. Field of Invention

The invention relates to an automatic steering device and method employed in a vehicle automatically driven for parking, for example, without requiring a vehicle operator to perform a steering operation.

2. Description of Related Art

An automatic steering device disclosed in Japanese Patent Application Laid-Open publication No. 4-205505 allows the operator of the vehicle to perform the steering operation easily during the automatic steering operation by generating automatic steering torque and an assist torque of the power steering simultaneously. The automatic steering device reduces the steering torque in excess of the automatic steering torque using the assist torque of the power steering. When the vehicle operator intends to perform the steering operation in the automatic steering mode, the steering torque is reduced so as to assist the vehicle operator to perform the steering operation easily.

When the vehicle operator performs steering operation in the automatic steering mode, the steering mode is switched to the manual steering mode by cancellation of the automatic steering mode. According to the technology disclosed in the aforementioned publication, the automatic mode can be smoothly switched to the manual steering mode. As the automatic steering device that has been produced before introduction of the aforementioned technology generates no assist torque of power steering in the automatic steering mode, the automatic steering torque is lost at substantially a high rate. The assist torque, in turn, is generated at a high rate in the direction opposite to that of the automatic steering torque, resulting in a sharp change in the steering reaction force. On the contrary, the technology disclosed in the aforementioned publication prevents sharp change in the steering reaction by reducing the steering torque in excess of the automatic steering torque. As a result, the steering mode can be smoothly switched between the manual steering mode and automatic steering modes.

The technology for switching the steering mode from the automatic steering mode to the manual steering mode in response to the steering operation of the vehicle operator is disclosed in JP-A-11-198839. In this technology, it is determined whether the steering operation has been performed by the vehicle operator based on detection values of the steering torque detected by the steering torque sensor.

With the automatic steering device that generates the automatic steering torque and the assist torque of power steering simultaneously, the vehicle operator is allowed to perform the steering operation even in the automatic steering mode at a reduced steering torque. The steering torque that has been kept small for assisting the vehicle operator may, in turn, make it difficult to determine whether the steering operation has been performed based on the steering torque detection values. The threshold value of the steering torque detection values have to be decreased so as to determine the steering operation of the vehicle operator. In this case, however, it is difficult to distinguish the steering torque generated by the steering operation of the vehicle operator from an inertia torque of the steering wheel itself as noise. As a result, the steering operation cannot be accurately detected.

SUMMARY OF THE INVENTION

According to an embodiment of the invention, an automatic steering device applies a steering torque in an automatic steering mode to a steering shaft of a steering mechanism that turns a wheel of a vehicle in accordance with rotation of the steering shaft connected to a steering wheel. The automatic steering device includes a controller that calculates an automatic steering torque value and a target assist torque value, and an actuator that is controlled by the controller so as to apply a torque corresponding to a sum of the automatic steering torque value and the target assist torque value to the steering shaft. The controller calculates the target assist torque value by multiplying an assist torque gain by a steering torque applied by an operator of the vehicle from the steering wheel to the steering shaft. The controller sets the assist torque gain in the automatic steering mode so as to be smaller than an assist torque gain in a non-automatic steering mode.

As the assist torque gain in the automatic steering mode becomes smaller than that in the non-automatic (manual) steering mode, the steering torque generated by the steering operation in the automatic steering mode is increased to a certain magnitude. This makes it possible to set the threshold value of the steering torque for detecting the steering operation to a relatively large value. Accordingly the steering torque can be easily distinguished from the inertia torque of the steering wheel. The steering operation performed by the vehicle operator can be accurately determined based on the detection value of the steering torque, and accordingly, the automatic steering operation can be accurately switched to the manual steering operation.

Though the steering torque in the automatic steering mode is increased to a certain magnitude, the steering operation in the automatic mode can be easily performed compared with the case where no assist torque is generated. This makes it possible to suppress sharp reduction in the steering torque generated by switching operation from automatic steering to manual steering upon a steering operation performed by the vehicle operator.

The actuator includes an electric motor that serves to apply a torque to the steering shaft. The controller controls the electric motor such that the torque applied to the steering torque corresponds to a sum of the target assist torque value and the automatic steering torque value.

The actuator can be simply structured by the electric motor serving to provide the steering shaft with both the automatic steering torque and the assist torque.

BRIEF DESCRIPTION OF THE DRAWINGS

The invention will be described with reference to the following drawings which illustrate an exemplary embodiment of the invention, and wherein.

DETAILED DESCRIPTION OF PREFERRED EMBODIMENTS

Figure 1:
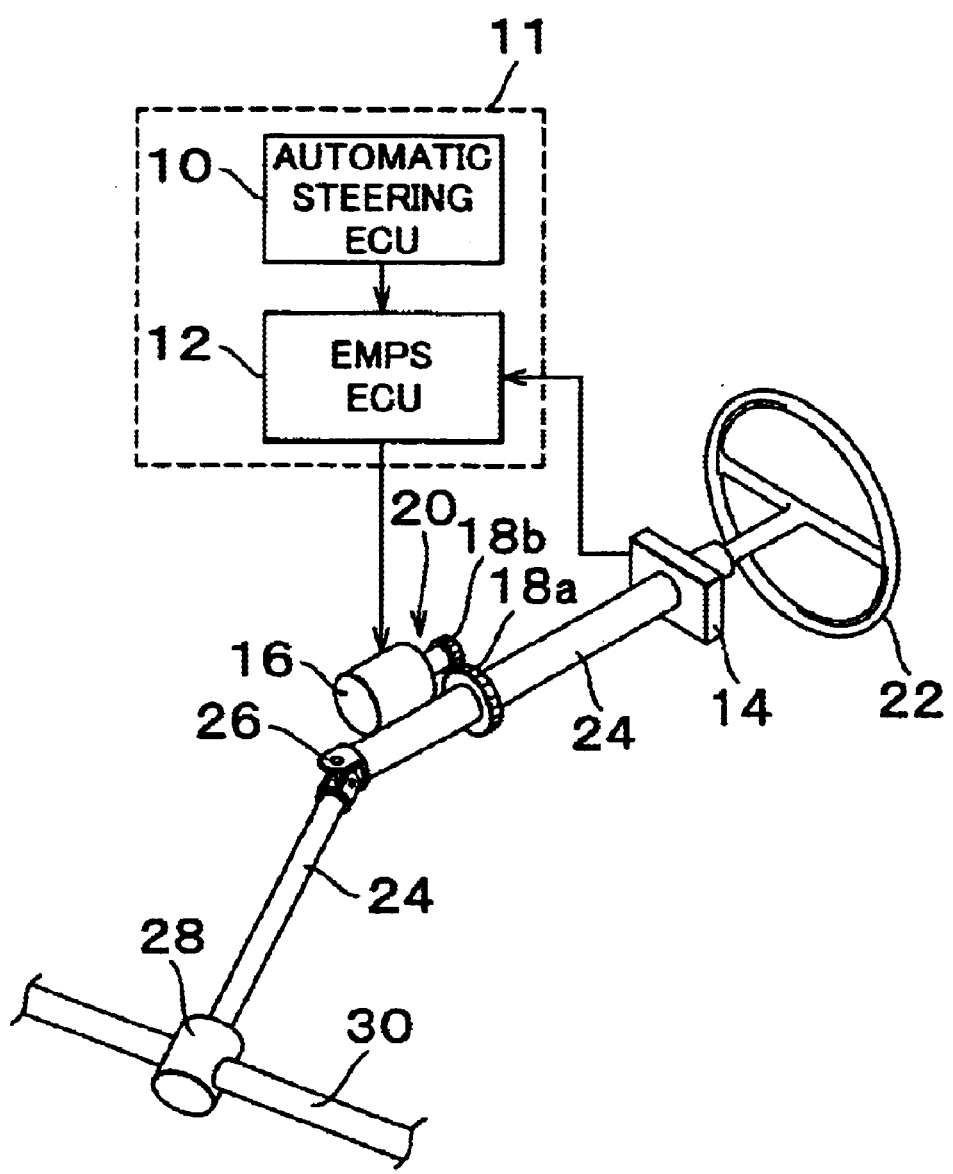
FIG. 1 is a schematic view of a construction of an automatic steering device according to an embodiment of the invention.

FIG. 1 is a schematic view showing an automatic steering device according to an embodiment of the invention and a steering mechanism to which the automatic steering device is applied. The automatic steering device includes an electric control unit (ECU) 10 for automatic steering, an electric control unit (ECU) 12 for EMPS (Electric Motor Power Steering), a steering torque sensor 14, and an EMPS actuator 20 as a combination of an electric motor 16 and gears 18a, 18b.

The ECUs 10 and 12 constitute a controller 11 of the automatic steering device. A steering shaft 24 is provided with the steering torque sensor 14 that is directly connected to a steering wheel 22. The steering torque sensor 14 detects a steering torque given from the steering wheel 22 to the steering shaft 24. The gear 18a fixed to the steering shaft 24 is in mesh with the gear 18b fixed to a shaft of the electric motor 16.

The steering shaft 24 is joined at a predetermined position by a universal joint 26. One end of the steering shaft 24 is connected to a side rod 30 via a gear box 28 such as a rack and pinion steering gear box.

The controller 11 calculates a target actuator torque value, and controls the actuator 20 so as to apply a torque equal to the target actuator torque value to the steering shaft 24.

The target actuator torque value corresponds to a sum of the target assist torque value and the automatic steering torque value. The target assist torque value is calculated by the ECU 12 on the basis of the steering torque detection value detected by the steering torque sensor 14.

The automatic steering torque value is calculated by the ECU 10 and is sent to the ECU 12. The ECU 12 calculates the target actuator torque value by adding the automatic steering torque value that has been sent from the ECU 10 to the target assist torque value.

Because the automatic steering torque value is zero in the manual steering mode, that is, non-automatic steering mode, the target actuator torque value becomes equal to the target assist torque value. The ECU 12 calculates the target assist torque value based on the steering torque detection value detected by the steering torque sensor 14 in the non-automatic steering mode. The actuator 20, thus, is controlled to generate the assist torque that corresponds to the target assist torque value. The ECU 12 calculates the target assist torque value by multiplying the assist torque gain by the steering torque detection value detected by the steering torque sensor 14.

In the automatic steering mode, the ECU 12 calculates the target actuator torque value by adding the target assist torque value to the automatic steering torque value determined by the ECU 10. The ECU 12 controls the actuator 20 to generate the torque corresponding to the target actuator torque value.

In the automatic steering mode, the steering torque detection value detected by the steering torque sensor 14 is kept zero except at start and end of the automatic steering operation until the vehicle operator performs a steering operation. Accordingly the target actuator torque value becomes equal to the automatic steering torque value.

At start and end of the automatic steering operation, the inertia torque is generated instantaneously in the direction opposite to that of the automatic steering force due to the inertia of the steering wheel 22. The steering torque sensor 14 may detect the inertia torque as a noise that interferes with detection of the steering torque.

Figure 2A:
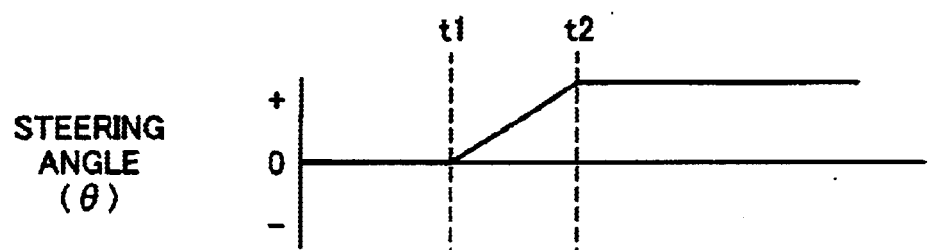
FIGS. 2A and 2B show timing charts each representing a relationship between the steering angle and the steering torque in comparison with the inertia torque.
Figure 2B:

FIG. 2A is a timing chart of a steering angle, and FIG. 2B is a timing chart of a steering torque detection value. In those figures, the steering operation in automatic steering mode starts at a time t1 and ends at time t2. That is, the automatic steering operation is performed between the times t1 and t2. For the period when the automatic steering operation is performed, the detected steering torque values form an impulse wave-form pattern, indicating the inertia torque caused by the inertia of the steering wheel 22.

Figure 3:
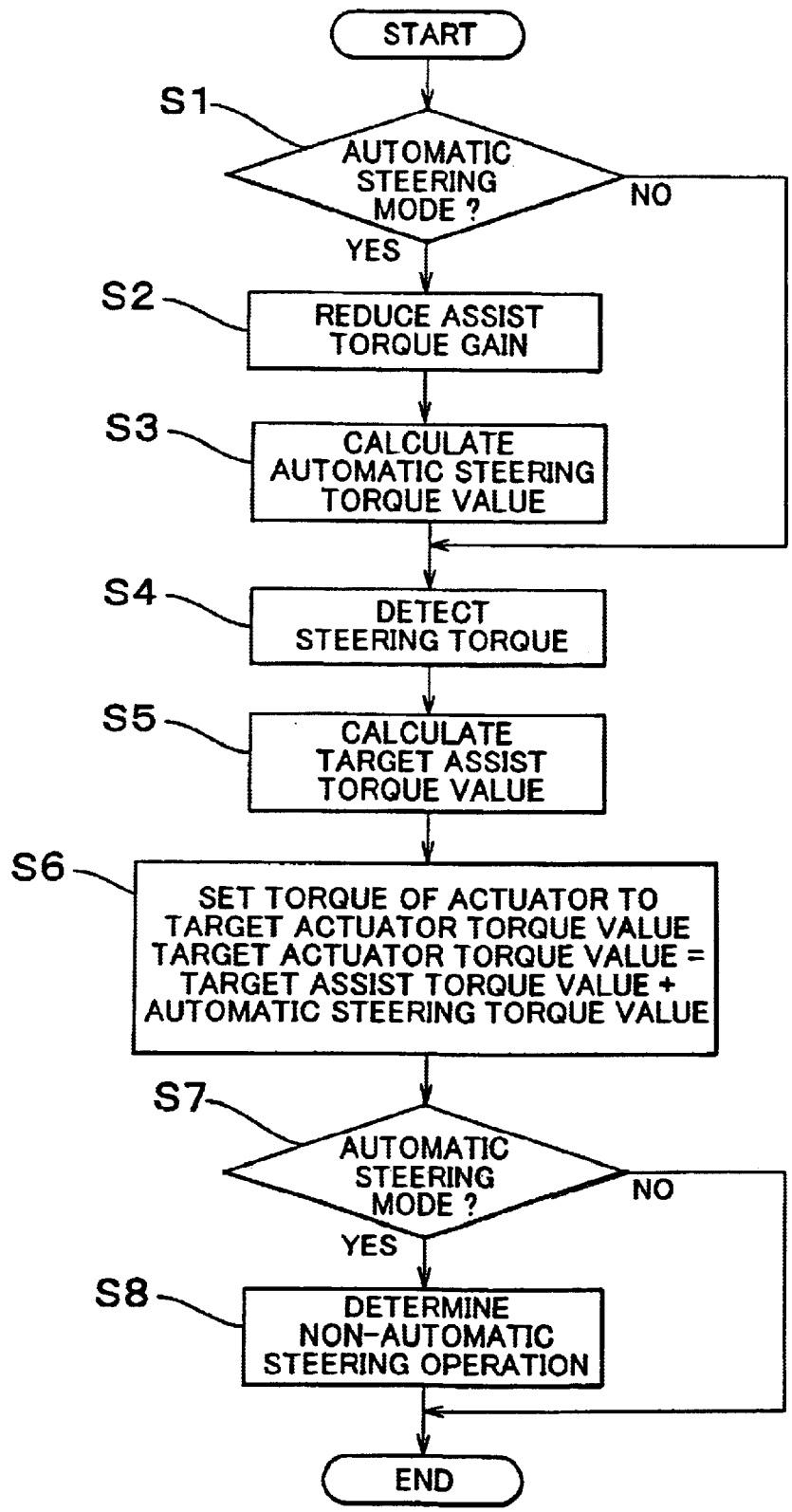
FIG. 3 is a flowchart of a control routine for determining the manual steering operation.

The operation of the automatic steering device as structured above will be described referring to a flowchart shown in FIG. 3.

In step S1, it is determined whether the vehicle is running under automatic steering mode. If YES is obtained, that is, the vehicle is running in the automatic steering mode, the process proceeds to step S2 where the assist torque gain is reduced by the ECU 12.

The assist torque gain in the automatic steering mode is decreased to less than that in the manual steering mode. Assuming that the assist torque gain in the manual steering mode is set such that the ratio of the steering torque to the assist torque becomes 1:15, the assist torque gain value is set to be reduced in the automatic steering mode such that the ratio of the steering torque to the assist torque becomes 1:3.

Then in step S3, the ECU 10 calculates the automatic steering torque value. The process proceeds to step S4 where the steering torque is detected by the steering torque sensor 14. Based on the detected steering torque, the ECU 12 calculates the target assist torque value in step S5.

If NO is obtained in step S1, that is, the vehicle is not running in the automatic steering mode, the process directly proceeds to step S4.

In step S6, the target assist torque value calculated in step S5 is added to the automatic steering torque value calculated in step S3, and the actuator 20 is controlled to make the torque of the actuator 20 to be equal to the target actuator torque value.

The process proceeds to step S7 where it is determined whether the vehicle is running in the automatic steering mode. If YES is obtained, that is, the vehicle is running in the automatic steering mode, the process proceeds to step S8. In step S8, it is determined whether the vehicle is running in the non-automatic steering mode (manual steering mode) based on the detection torque value detected by the steering torque sensor 14. If NO is obtained in step S7, that is, the vehicle is running in the non-automatic steering mode, the control routine ends.

Figure 4A:
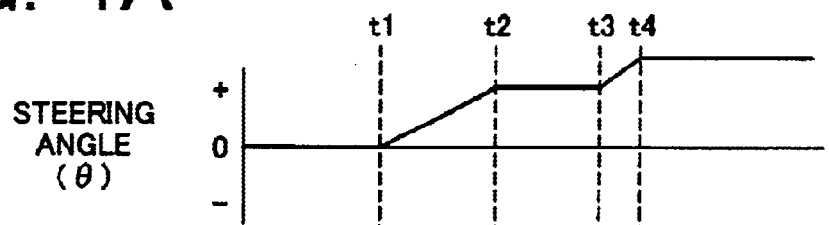
FIGS. 4A to 4D show timing charts each representing chronological change in the steering torque values detected by the embodiment of the invention in comparison with general types of the automatic steering device.
Figure 4B:
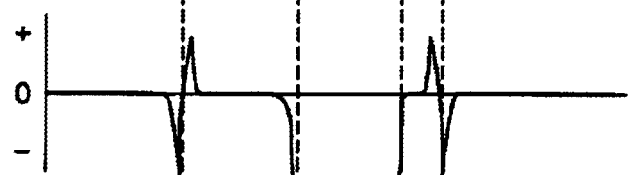
Figure 4C:
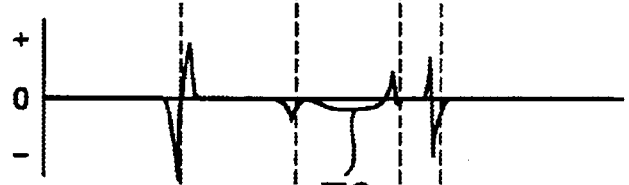

Referring to FIGS. 4A to 4D, determination with respect to the manual steering mode executed in step S8 of the control routine shown in FIG. 3 will be described. FIG. 4A is a timing chart of the steering angle. Each of FIGS. 4B to 4C is a timing chart of the steering torque detection value of the automatic steering device of the aforementioned types and the embodiment of the invention, respectively. In those figures, the automatic steering operation starts at a time t1, and a signal indicating the manual steering operation is received (the steering operation is performed by the vehicle operator) at a time t2. At a time t3, the manual steering operation is no longer detected, and at a time t4, the automatic steering operation ends. The automatic steering operation in accordance with the automatic steering torque value is performed between the times t1 and t4. Between the times t2 and t3, the steering torque is generated by manual steering operation of the vehicle operator so as to prevent the steering angle from changing against the automatic steering operation.

Figure 4D:
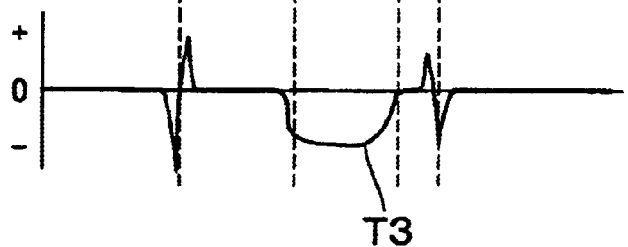

FIG. 4B shows a chronological change in the steering torque detection values of a generally employed automatic steering device that does not operate the power assist function in the automatic steering mode. FIG. 4C shows a chronological change in the steering torque detection values of another type of generally employed automatic steering device. In the automatic steering device of this case, the power assist function is used at the automatic steering mode, and the obtained assist torque gain is made equal to that at the non-automatic steering mode. FIG. 4D shows a chronological change in the steering torque detection values of the automatic steering device according to the embodiment of the invention.

In the case where power assisting is not performed during the steering operation of the vehicle operator in the automatic steering mode as shown in FIG. 4A, the steering torque in the direction opposite to that of the steering operation (minus direction) as shown by T1 of FIG. 4B has to be applied.

Meanwhile, in another type of the automatic steering device that performs power assisting with the assist torque gain which is equal to that used in the manual steering operation, a small steering torque is applied to the opposite (minus) direction as shown by the torque value T2 of FIG. 4C. The steering angle, thus, can be maintained against the automatic steering operation. In the aforementioned case, the difference between the torque values T1 and T2 can be compensated by the assist torque. This type of automatic steering device allows the vehicle operator to perform steering operations easily in the automatic steering mode. As the steering torque, however, is small, it is difficult to detect the steering operation in the manual mode based on the detection values of the steering torque sensor.

In the automatic steering device according to the invention, the assist torque gain during the automatic steering operation is controlled to be smaller than that used during the non-automatic steering operation. The steering torque detection values detected based on the steering operation in the automatic steering mode form a wave-form with a certain magnitude and width as shown by the torque value T3 of FIG. 4D. The wave-form shown in FIG. 4D is clearly different from the impulse waveform of the steering torque detection values owing to the inertia torque. This makes it possible to detect the manual steering operation based on the width and magnitude of the wave-form by distinguishing the change in the steering torque detection values obtained by the steering operation from the change in the steering torque detection values caused by the inertia torque.

The automatic steering device according to the invention allows the vehicle operator to perform the steering operation easily by power assisting even in the automatic steering mode. The automatic steering device may further detect the manual steering operation performed by the vehicle operator accurately.

As shown in FIGS. 4A to 4D, the automatic steering operation is maintained even after the end of the steering operation. Actually, however, upon detection of the steering operation (manual steering operation) in the automatic steering mode, the automatic steering device serves to switch the steering mode to the manual mode by stopping the automatic steering operation. That is, the automatic steering device sets the automatic steering torque value to zero upon detection of the manual steering operation.

In the general type of the automatic steering device providing no power assisting during the automatic steering operation as shown in FIG. 4B, the counter force of the steering torque may decrease at a high rate when the automatic steering torque becomes zero because of a large steering torque. This makes the vehicle operator feel uncomfortable at a time of steering operation.

The automatic steering device according to the embodiment of the invention activates the power assisting function in the automatic steering operation so as to reduce the steering torque. This makes it possible to suppress the sharp decrease in the counter force against the steering torque generated upon switching the steering mode from the automatic steering mode to the manual steering mode.

The steering operation is detected by determining whether the steering torque detection value exceeds the threshold value and whether the time period for which the state where the steering torque detection value is held over a predetermined holding time. At least one threshold value Th of the steering torque detection value may be combined with at least one predetermined holding time S.

A plurality of the threshold values Th of the steering torque detection values can be combined with a plurality of predetermined holding times S. It is assumed that three kinds of threshold values Th1, Th2, and Th3 are set and three kinds of the predetermined holding times S1, S2, S3 are set. It can be determined that the steering operation has been performed by the vehicle operator when the following conditions are established;

(1) The steering torque detection value is equal to or greater than Th1, which is held for the time period equal to or longer than S1;
(2) The steering torque detection value is equal to or greater than Th2, which is held for the time period equal to or longer than S2; or
(3) The steering torque detection value is equal to or greater than Th3, which is held for the time period equal to or longer than S3.

With the conditions based on which the steering operation performed by the vehicle operator is determined, the automatic steering mode can be terminated for a short period when the vehicle operator applies a large steering torque. When the vehicle operator applies a small steering torque, the automatic steering operation can be stopped after an elapse of a short time period.

In the embodiment of the invention, a single unit of the actuator 20 is used, which is controlled such that the output torque becomes equal to the sum of the target assist torque value and the automatic steering torque value. However, the automatic steering device may be structured to have an actuator for the automatic steering operation and another actuator for the power assisting, separately. The output of the actuator for the automatic steering is made equal to the torque value in the automatic steering mode, and the output of the actuator for power assisting may be made equal to the target actuator torque value. If each function of the actuators for applying the automatic steering torque and for applying the assist torque is combined into a single function realized by a single electric motor, the structure of the automatic steering device can further be simplified.

The automatic steering device according to the invention controls the assist gain to the value smaller than that used at the non-automatic operation (manual operation). The steering torque is increased to a certain extent when the vehicle operator performs the steering operation. The steering torque, thus, can be clearly distinguished from the inertia torque of the steering wheel, and it may be determined whether the steering operation has been performed on the basis of the steering torque detection values. Accordingly the automatic steering operation can be accurately switched to the manual steering operation on the basis of the termination results.

In the illustrated embodiment, the apparatus is controlled by the controller 11 (one or more electronic control units (ECUs), which is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller 11 can be a plurality of separate dedicated or programmable integrated or other electronic circuits or devices (e.g., hardwired electronic or logic circuits such as discrete element circuits, or programmable logic devices such as PLDs, PLAs, PALs or the like). The controller 11 can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller 11. A distributed processing architecture can be used for maximum data/signal processing capability and speed.

While the invention has been described with reference to exemplary embodiments thereof, it is to be understood that the invention is not limited to the disclosed embodiments or constructions. To the contrary, the invention is intended to cover various modifications and equivalent arrangements. In addition, while the various elements of the embodiments are shown in various combinations and configurations, which are exemplary, other combinations and configurations, including more, less or a single element, are also within the spirit and scope of the invention.

What is claimed is:

1. A steering device for a vehicle, which executes an automatic steering mode and a non-automatic steering mode, comprising:

an actuator for generating an assist torque with respect to a steering torque applied by an operator during both the automatic steering mode and the non-automatic steering mode; and a controller being adapted to set a magnitude of the assist torque to be smaller in the automatic steering mode than in the non-automatic steering mode, wherein a ratio of the steering torque to the assist torque in the non-automatic steering mode is less than the ratio of the steering torque to the assist torque in the automatic steering mode.

2. A steering device according to claim 1, further comprising:

a steering mechanism that turns a wheel of the vehicle in accordance with rotation of a steering shaft connected to a steering wheel, wherein the actuator applies an automatic steering torque to the steering mechanism during the automatic steering mode, the assist torque being added to the automatic steering torque in the automatic steering mode.

3. A steering device according to claim 2, wherein the controller is further adapted to:

set an assist torque gain which is smaller in the automatic steering mode than in the non-automatic steering mode, calculate a target assist torque value by multiplying the assist torque gain by a steering torque applied to the steering mechanism by the operator via the steering wheel; and apply a torque corresponding to a sum of a target automatic steering torque value and the target assist torque value to the steering mechanism from the actuator.

4. A steering device according to claim 3, wherein the actuator comprises an electric motor that applies a torque to the steering mechanism, and the controller controls the electric motor such that the torque applied to the steering mechanism corresponds to the sum of the target assist torque value and the target automatic steering torque value.

5. A steering device according to claim 3, wherein the controller detects a steering operation performed by the operator of the vehicle by determining whether the steering torque applied by the operator exceeds a threshold value and whether the same steering torque is kept larger than the threshold value for at least a predetermined time.

6. A steering device according to claim 5, wherein at least one threshold value and at least one predetermined time are used for detecting the steering operation performed by the operator of the vehicle.

7. A steering device according to claim 3, wherein upon detection of the steering operation performed by the operator of the vehicle, the controller stops the automatic steering mode and switches to the non-automatic steering mode.

* * * * *